(12) United States Patent
Huber et al.

(10) Patent No.: US 6,839,478 B2
(45) Date of Patent: Jan. 4, 2005

(54) OPTICAL SWITCHING SYSTEM BASED ON HOLLOW WAVEGUIDES

(75) Inventors: Talya Huber, Yehud (IL); Avigdor Huber, Yehud (IL)

(73) Assignee: Terraop Ltd., Kfar Saba (IL)

( * ) Notice: Subject to any disclaimer, the term of this patent is extended or adjusted under 35 U.S.C. 154(b) by 46 days.

(21) Appl. No.: 10/135,359

(22) Filed: May 1, 2002

(65) Prior Publication Data

US 2003/0035613 A1 Feb. 20, 2003

Related U.S. Application Data

(60) Provisional application No. 60/287,383, filed on May 1, 2001.

(51) Int. Cl.[7] .............................. G02B 6/35; G02B 6/20
(52) U.S. Cl. ............................. 385/16; 385/17; 385/125
(58) Field of Search .............................. 385/15, 16, 17, 385/125

(56) References Cited

U.S. PATENT DOCUMENTS

| | | | | |
|---|---|---|---|---|
| 5,271,075 A | * | 12/1993 | Gfeller et al. ................. 385/20 |
| 5,729,646 A | * | 3/1998 | Miyagi et al. ............... 385/125 |
| 5,995,696 A | * | 11/1999 | Miyagi et al. ............... 385/125 |
| 6,501,869 B1 | * | 12/2002 | Athale .......................... 385/18 |

* cited by examiner

*Primary Examiner*—John D. Lee
*Assistant Examiner*—Tina M Lin
(74) *Attorney, Agent, or Firm*—Mark M. Friedman

(57) ABSTRACT

A hollow waveguide based optical switch, and novel hollow waveguide-based switch architectures for optical communications. The switch comprises a pair of hollow waveguides overlapping over a common section that includes a common opening, a first conductive flexible lever attached to one of the hollow waveguides, the first lever configured to assume upon actuation at least two switching positions within the pair of waveguides at the common opening, a second conductive flexible lever attached to the other of the hollow waveguides, the second lever configured to assume upon same the actuation same at least two switching positions within the pair of waveguides as the first lever while keeping a substantially parallel geometry with the first lever, and means to actuate the first and the second levers in order to achieve the at least two switching positions.

6 Claims, 18 Drawing Sheets

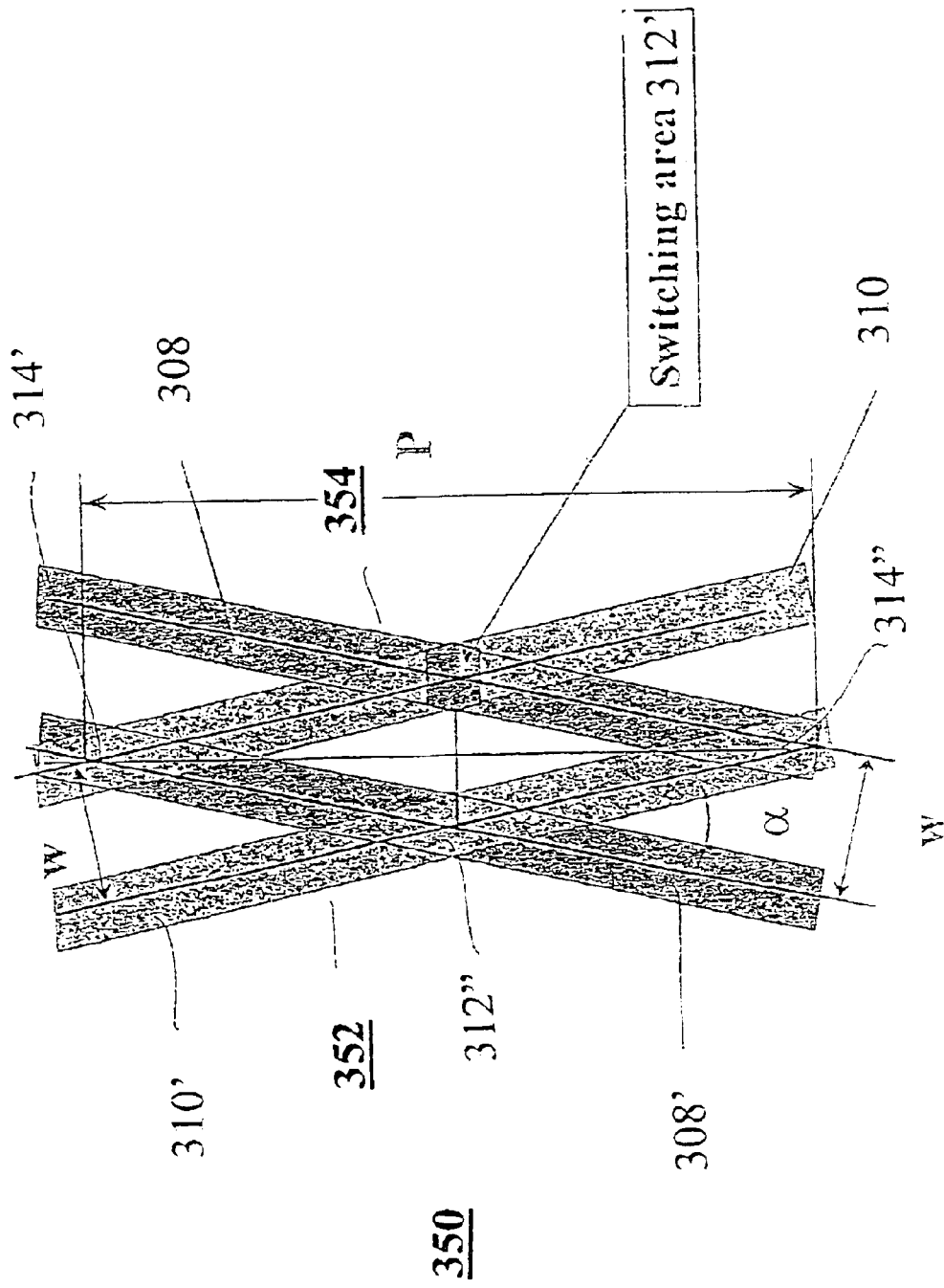

520

US 6,839,478 B2

OPTICAL SWITCHING SYSTEM BASED ON HOLLOW WAVEGUIDES

CROSS REFERENCE TO RELATED APPLICATIONS

The present application claims the benefit of priority from U.S. Provisional Patent Application No. 60/287,383 filed May 1, 2001, the contents of which are incorporated herein by reference.

FIELD AND BACKGROUND OF THE INVENTION

Growing demand for bandwidth is fueling the need for advances in optically based telecommunications. Many of these advances are provided by new developments in optical components. Most of the currently available solutions have slow switching times, in the order of milliseconds, high insertion loss and lack scale-up capabilities. On the other hand, there are a number of technologies that have high switching speed, but are fundamentally limited in the number of ports. Following is a short review of existing optical component technologies for both active (e.g. switching) and passive (e.g. splitting) applications.

MEMS (Micro Electro Mechanical Systems) technology is a relatively mature and cost effective technology, in use for more than 10 years for commercial applications. There are two primary types of MEMS optical components or devices: 2-D (2 dimensional architecture) and 3-D (3 dimensional architecture) devices. 2-D or digital MEMS devices operate in an "on/off" fashion. The typical architecture for the 2D MEMS device is the digital crossbar. 3-D MEMS devices involve a much more intricate design and driver set. 2-D MEMS components suffer from high insertion loss and cross talk, and cannot be easily scaled to a high port count as a result of the fact that the number of nodes of the crossbar equals the square of the port count number. 3-D MEMS components suffer from complex control system and high production cost, and therefore have low cost effectiveness. Both technologies operate in the millisecond switching speed domain, and are therefore not suited for IP routing and other high speed switching applications. A free-space mode of light propagation is common to all MEMS based switching solutions.

Another technology for optical switching is the "Photonic Switching Platform". This technology was derived from the ink injection technology, and uses oil as an injection fluid in a two-dimensional switching device in which an oil bubble does the switching as a function of temperature changes. Operational instabilities, high insertion loss and operational speed of milliseconds are the main drawbacks of this technology.

A number of vendors are developing optical switches based on liquid crystal technology—the same basic technology behind laptop computer and other electronic displays. A typical liquid crystal switch works by using an electrical current to alter the polarization modes of light passing through the fabric. Limitations of liquid crystal technologies include inability to scale to high port counts in practical applications, and high polarization dependence loss and insertion loss.

Optical switch fabrics with fast switching speeds but with small port counts are under development by the industry, mainly using electro-holography or thermo-optical approaches for the switching mechanism. At present, no commercial, fast switching (sub-microsecond) switches with high port count are available, due to the inability to scale-up, and the relatively high production costs of these two technologies.

All existing optical telecommunication systems are based on optical fibers as the transmission medium. Integrated (as well as hybrid) optical components use optical waveguides in both active and passive applications. Optical waveguides can be classified into two groups or types: solid waveguides and hollow waveguides (hereinafter "HW"s). Existing waveguide-based optical switching systems include exclusively solid waveguides ("first group") that operate on the principle of a differential refraction index between the waveguiding path and the surroundings: the waveguiding path (in short, the "waveguide") has a higher index of refraction than the surrounding environment. In these devices the switching occurs between two waveguides. The architecture of devices based on this technology requires many stages of "cascading" for the multiple ports devices resulting in the cross talk. In addition, geometrical limitations on the waveguides in the coupling region lead to large footprint areas or alternatively to small port counts for the available fabric dimension. This type of waveguide, while having the advantage of small losses at bends, additionally has a number of disadvantages: it cannot carry high-energy signals, and it experiences losses at its connections with the external world, e.g. to external fibers.

The second type of waveguides is hollow waveguides with refractive coatings. A "hollow optical pipeline made of reflective pipes" was first proposed by Charles C. Eaglesfield in January 1961. HWs are described extensively in the literature, for example in "Optical fiber communications: devices, circuits and systems" by M. J. Howes and D. V. Morgan, John Wiley&Sons, E. A. J. Marcatili and R. A. Schmeltzer, "Hollow metallic and dielectric waveguides for long distance optical transmission and lasers", Bell Syst. Tech. J, V43, 1964, pp. 1759–1782, and more recently in T. Miura, F. Koyama, Y. Aoki, A. Matsutani and K. Iga "Hollow Optical Waveguide for Temperature-Insensitive Photonic Integrated Circuits" Jpn. J. Appl. Phys. Vol. 40 (2001), L688–L690, Part 2, No. 7A.

Hollow waveguides are not used for communication purposes, mainly because they have high losses as a result of the waveguide bending. Nevertheless, hollow waveguides have some advantages when compared with conventional waveguides, namely, ability to carry high energy signals, and absence of losses in the connections between fiber and the waveguide. Hollow waveguides are mainly used in medical applications in the 10–20 $\mu$m IR wavelength range, due to their ability to transmit high energy densities.

In view of the disadvantages of existing technological solutions for optical components based on solid waveguides, it would be highly advantageous to have an optical switching system based on hollow waveguides that can carry high energy signals and reduce the losses at its interface with external fibers and similar elements. Another advantage of hollow waveguide based optical switching systems is the ability to integrate moving or non-moving switching elements inside the waveguide.

SUMMARY OF THE INVENTION

The present invention relates to integrated, chip based, fast optical switching systems, specifically optical switching systems incorporating hollow waveguides produced by MEMS technology, and operated digitally. Most specifically, the present invention discloses a novel, hollow waveguide based optical switch, and novel hollow waveguide-based switch architectures for optical communications. In contrast with prior art waveguide-based optical switching systems, the present invention discloses a new and novel concept that combines optomechanical switching mechanisms with waveguides in which the refractive index is lower that the index of the surrounding environment. The use of this novel concept allows design and fabrication of low insertion loss, optical path independent switches and switch arrays.

According to the present invention, there is provided an optical switching device, comprising: a first hollow waveguide having a cross section defined by a first core surrounded by a first enveloping wall, the first wall having a first opening, a second hollow waveguide having a second cross section defined by a second core surrounded by a second enveloping wall, the second wall having a second opening, the first and the second hollow waveguides positioned in a partially overlapping position defined by a common overlap of their respective openings. a first light guiding lever positioned substantially in the plane of the first opening and operative to be actuated by actuating signals to assume a first and a second switching position, and a second light guiding lever positioned substantially in the plane of the second opening and operative to be actuated by actuating signals to assume a synchronized first and a synchronized second switching position essentially identical with the first and second switching positions of the first light guiding lever.

According to one feature of the switching device of the present invention, the enveloping wall includes a conductive reflective coating.

According to another feature of the switching device of the present invention, the enveloping wall further includes an optional dielectric coating adjacent to the conductive reflective coating.

According to yet another feature of the switching device of the present invention, the first and second hollow waveguides are selected from the group consisting from rectilinear waveguides and S-shaped waveguides.

According to yet another feature of the switching device of the present invention, the overlapping position is further characterized by an intersection angle smaller than about 5 degrees.

According to yet another feature of the switching device of the present invention, the first and second light guiding levers include a conductive coating, and the actuating signals include electrical signals.

According to the present invention, there is provided a hollow waveguide based optical switch comprising: a pair of hollow waveguides overlapping over a common section that includes a common opening, a first conductive flexible lever attached to one of the hollow waveguides, the first lever configured to assume upon actuation at least two switching positions within the pair of waveguides at the common opening, a second conductive flexible lever attached to the other of the hollow waveguides, the second lever configured to assume upon the actuation in synchronization with the first lever the same at least two switching positions within the pair of waveguides as the first lever, while keeping a substantially parallel geometry with the first lever, and means to actuate the first and the second levers in order to achieve the at least two switching positions.

According to the present invention there is provided a hollow waveguide switch matrix comprising a first plurality of hollow waveguides arranged substantially in a first plane, each of the first plurality of waveguides having at least one first opening, a second plurality of waveguides arranged substantially in a second plane parallel with the first plane, each of the second plurality of waveguides having at least one second opening substantially overlapping a different opening of the at least one first openings, a first actuable light guiding lever related to each first waveguide of the first plurality and positioned substantially within the at least one first opening, and a second actuable light guiding lever related to each second waveguide of the second plurality and positioned substantially within the at least one second opening and in parallel with the first actuable lever, whereby synchronous actuation of the first and second light guiding levers results in the levers switching light between the first and the second pluralities of waveguides.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention relates to integrated, chip-based, optical switching systems, specifically optical switching systems incorporating waveguides. More specifically, the present invention discloses an optical switching system based on hollow waveguides. The principles and operation of an optical switching system based on hollow waveguides according to the present invention may be better understood with reference to the drawings and the accompanying description. As mentioned above, various HW structures, as well as fabrication processes are known in the art. The invention described herein may be implemented using such known waveguides and fabrication processes.

Figure 1:
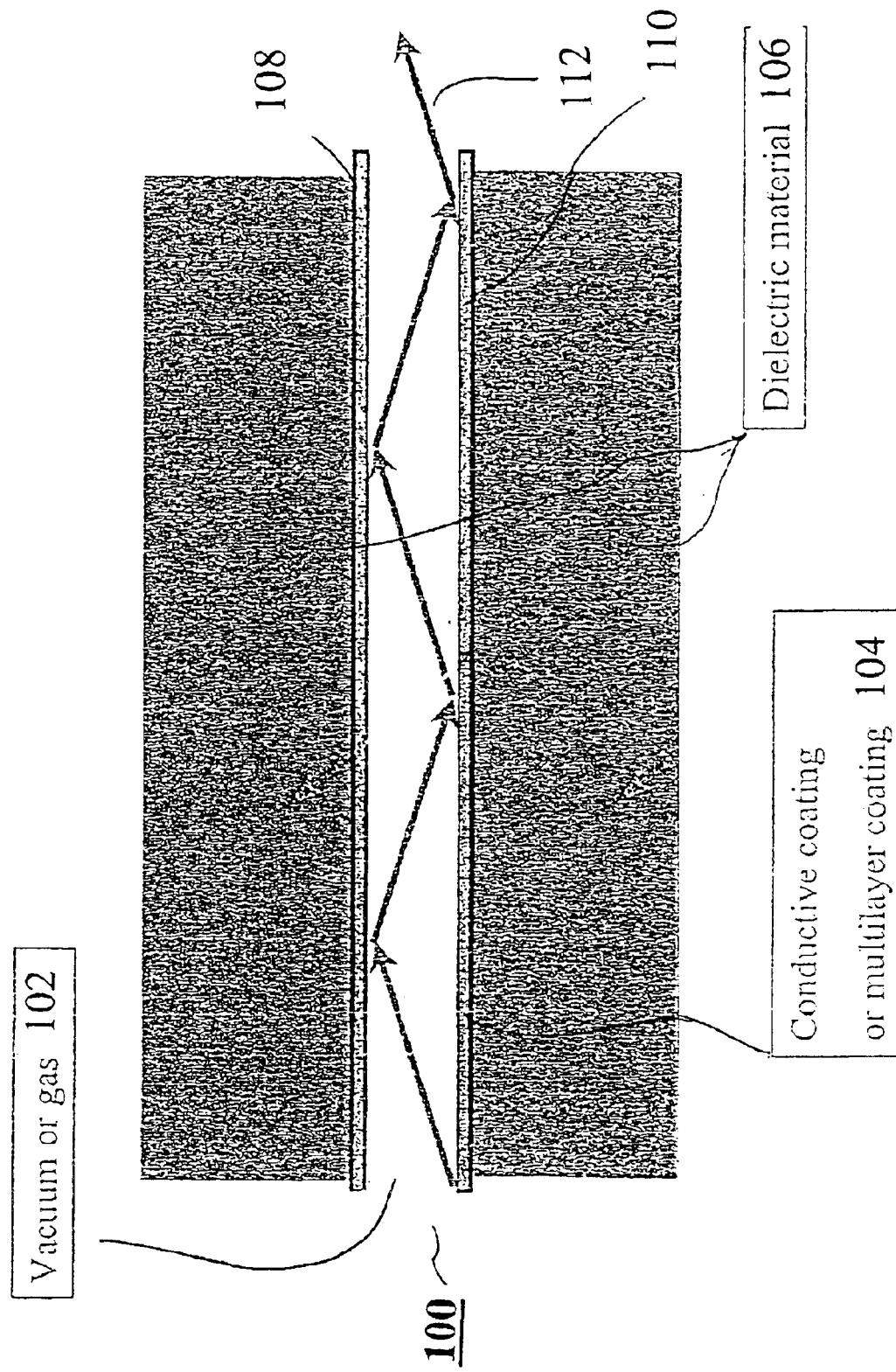
FIG. 1 is a schematic description of a hollow waveguide principle of operation.

FIG. 1 shows a longitudinal cross section of a HW 100 that includes a hollow (vacuum or gas filled) core 102 that can have a cross section of any shape (rectangular, round, hexagonal, etc.). The core is surrounded by a reflective coating 104 that may be single layered or multilayered, conductive or dielectric, and by an additional dielectric or conductive material 106 that wraps coating 104. Material 106 is used mainly as a mechanical matrix that holds the waveguide. When it is metallic it can be single layered. Reflective dielectric coatings are usually multilayered. Optionally, a multilayered dielectric coating of the metallic reflective surface can be used for improving the optical performance of the HW. In the longitudinal cross section of FIG. 1, coatings 104 and 106 are shown deposited on a top wall 108 and a bottom wall 110 of HW 100. Alternatively, if FIG. 1 is seen as a top viewed cross-section of a HW embedded in a substrate, walls 108 and 110 are the side walls of the HW. A ray 112 exemplifies the guiding of light within core 102 by reflection from coating 104. The metal is preferably one of high reflectance, e.g. gold or aluminum. Fabrication methods that can be used to make HWs are known in the art. The main processes involve etching, for example anisotropic wet etch (for hexagonal cross-section HW sections), isotropic wet etch (for semi-circular sections), RIE dry etch (for rectangular sections) and surface micromachining (for rectangular sections a few microns wide).

Figure 2:
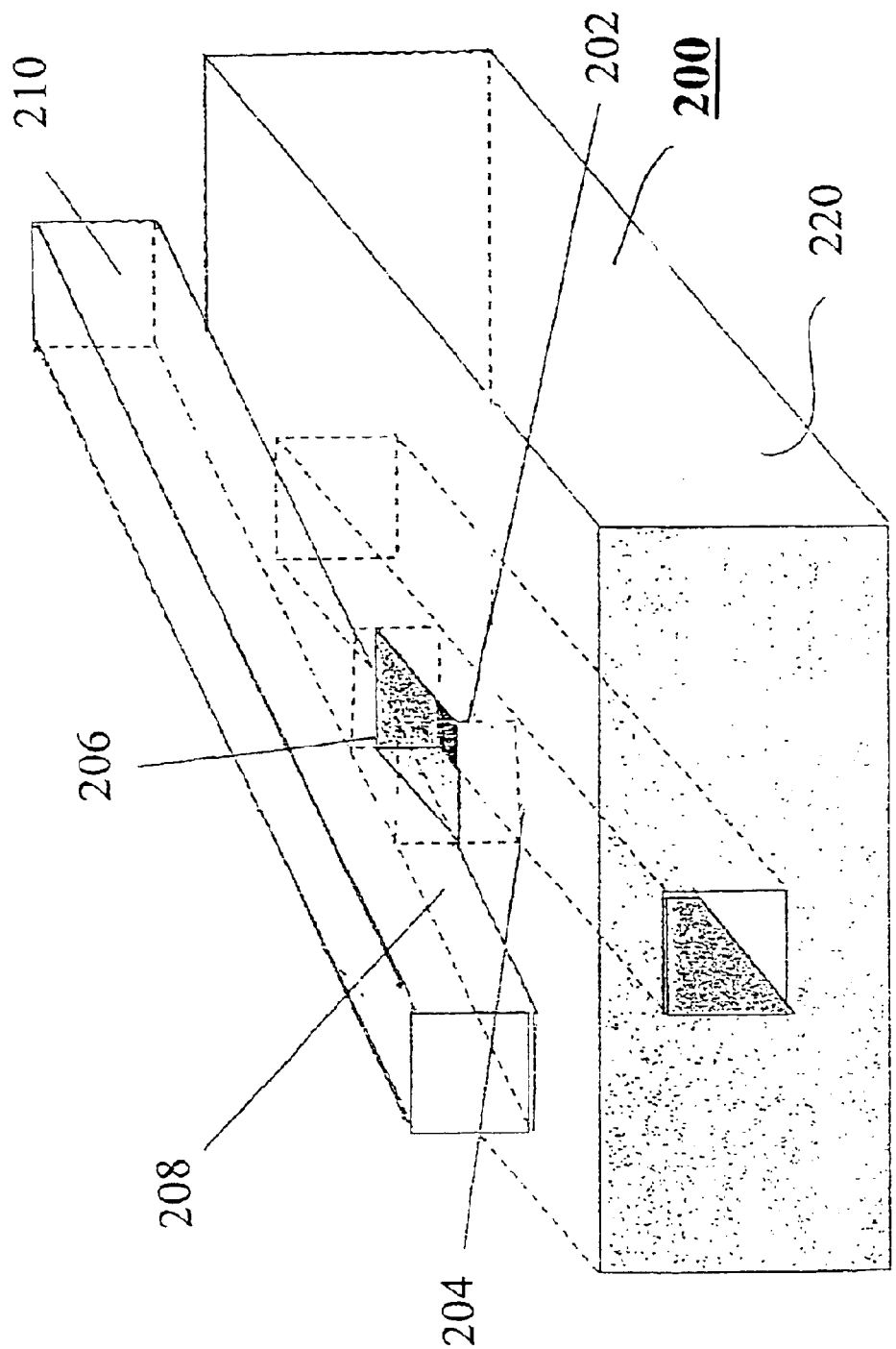
FIG. 2 shows schematically a top and a bottom hollow waveguide with respectively, bottom wall and top wall openings.

FIG. 2 shows a rectangular cross section of a first HW 200 with an opening or hole 202, in this case rectangular, on its top wall 204. A preferred embodiment of the switch element of the present invention will employ such an opening, which will overlap a similar opening 206 on a bottom wall 208 of a second HW 210. Each waveguide is embedded in a substrate, preferably a wafer made of a material such as silicon, silica, GaAs, or any other substrate material commonly used in microelectronic and integrated optic technologies. In FIG. 2, only HW 200 is shown embedded or "buried" in a substrate 220. As shown next, the two HWs are juxtaposed so that their openings define a common opening in a contact plane (defined below) when the two wafers containing the HWs are bonded "face to face" (each "face" in this case being the wafer plane that includes the waveguide opening).

Figure 3A:
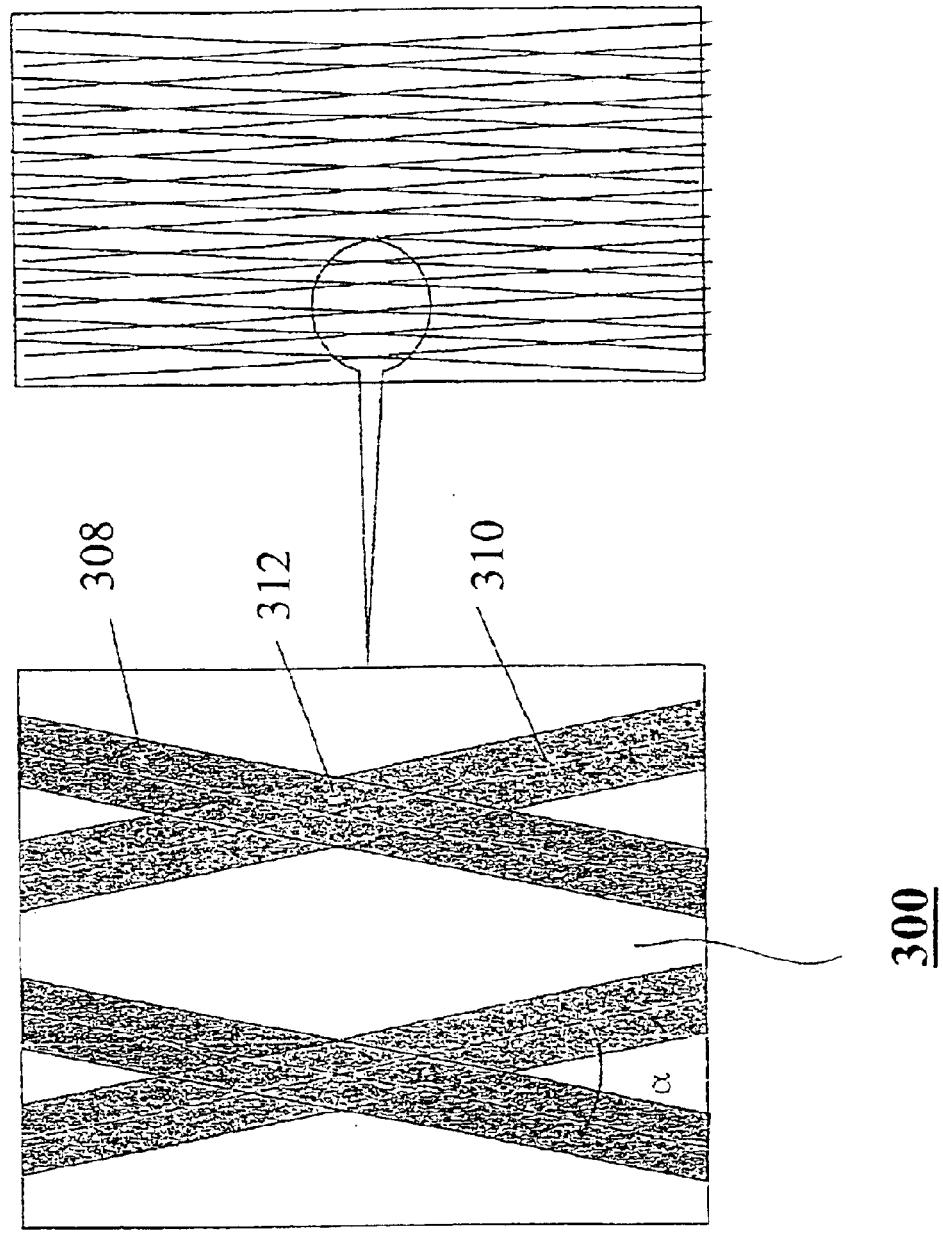
FIG. 3 shows non-orthogonal crossbar configurations of hollow waveguides: a) top view, b) perspective view, and c) elementary cell.
Figure 3B:
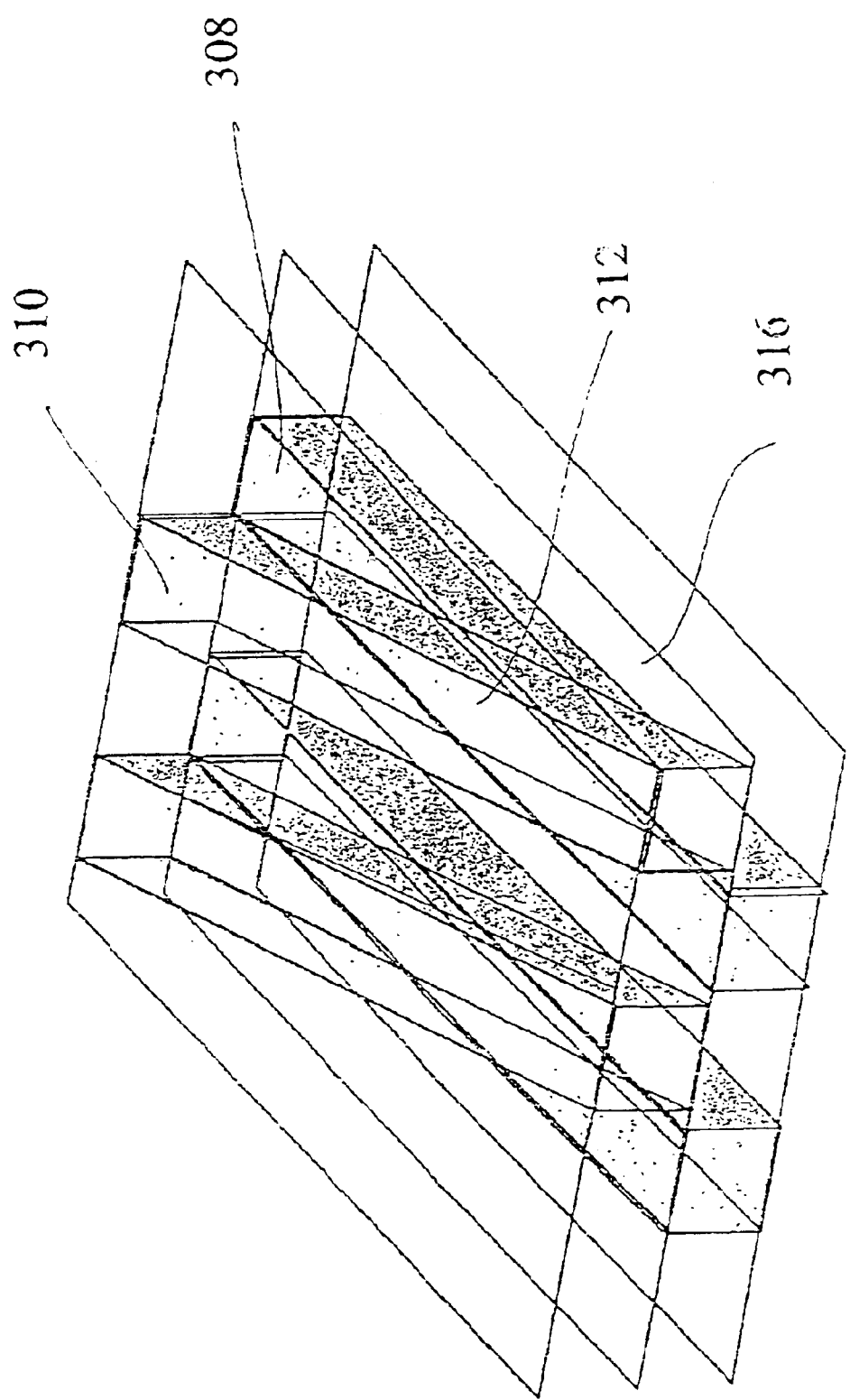

FIG. 3a shows a top view of two crossbars 300, each formed by two juxtaposed HWs, a first HW 308 and a second HW 310, positioned non-orthogonally to each other at a very small angle α (typically less than about 5 degrees), and overlapping with their openings over a "node" or switching area 312 that coincides substantially with the common opening (i.e. overlapping openings 202 and 206). FIG. 3b shows the same two HWs in perspective. The figure shows a contact plane 316 that contains the common opening. Although the two HWs are misaligned over most of their lengths by the small angle α, over the common opening they are fabricated (through, for example photolithographic definition of respective masks) for exact overlap. Small angles between waveguides in nodes permit to achieve low losses—each of the above-mentioned proposed architectures includes waveguides bent only slightly (see S. E. Miller "Directional control in light wave guidance", Bell Syst. Tech. J. 43, 1964, pp 1727–1739). The maximal admissible angular change in a waveguide is ~λ/(2a) where λ is the wavelength and a is the waveguide width.

FIG. 3c shows an elementary cell 350 composed of two HW cross bars 352 and 354. In the figure, W is the distance between two waveguide axes, and P is the pitch—the length of the "cell". HWs 308 and 308' are positioned in a first (e.g. "bottom") plane, while HWs 310 and 310' are positioned in a second (e.g. "top") plane. Although the figure shows explicitly only one node 312', there are clearly other nodes—312", 314' and 314" all of which contain openings that can serve as "switching areas" as described hereinbelow.

Figure 4:
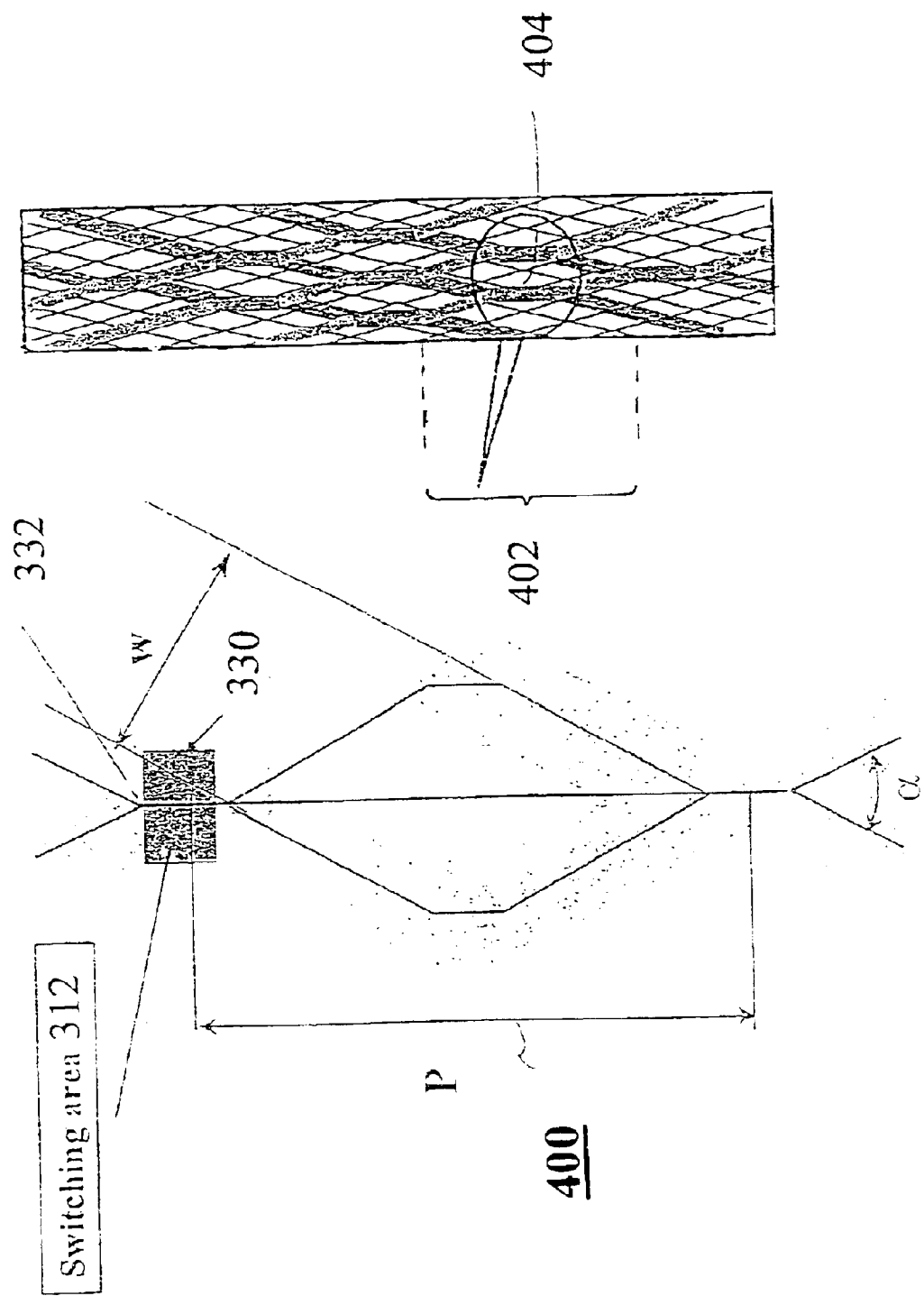
FIG. 4 shows a top-view of an S-shaped hollow waveguide crossbar and elementary cell.

One basic attribute of any "switching area" in any configuration is the requirement that the overlapping openings in the two juxtaposed waveguides forming the crossbar are substantially identical. That is, as shown in FIG. 4 in yet another configuration of the crossbar, in an "S-shaped" crossbar 400, switching area 312 can be defined by a length 330 and a width 332. Length 330 and width 332 are substantially the same as the dimensions of each opening in each HW, e.g. openings 202 and 206 in FIG. 2. The S-cross bar is obtained when each HW assumes an S-shape over a section of its length, such as section 402 in the array on the right of the figure. The S-shape is constrained by the same rule of small bends (i.e. an angle a smaller than about 5 degrees). The angle of the waveguide bend can be estimated using the following expression:

$$\alpha_{max} = \frac{\lambda}{2a}\frac{180}{\pi}$$

where α is the maximal admissible angle of the waveguide bend, λ is the wavelength (in μm), and a is half of the waveguide width (in μm). For example, for a waveguide width of 10 μm at a wavelength of 1.5 μm the maximal admissible angle is 2.5 degrees, and for a width of 5 μm, the angle is 5 degrees. In FIG. 4, P is the cell length, and W is the distance between waveguides in an S-shaped "cell".

Figure 5A:
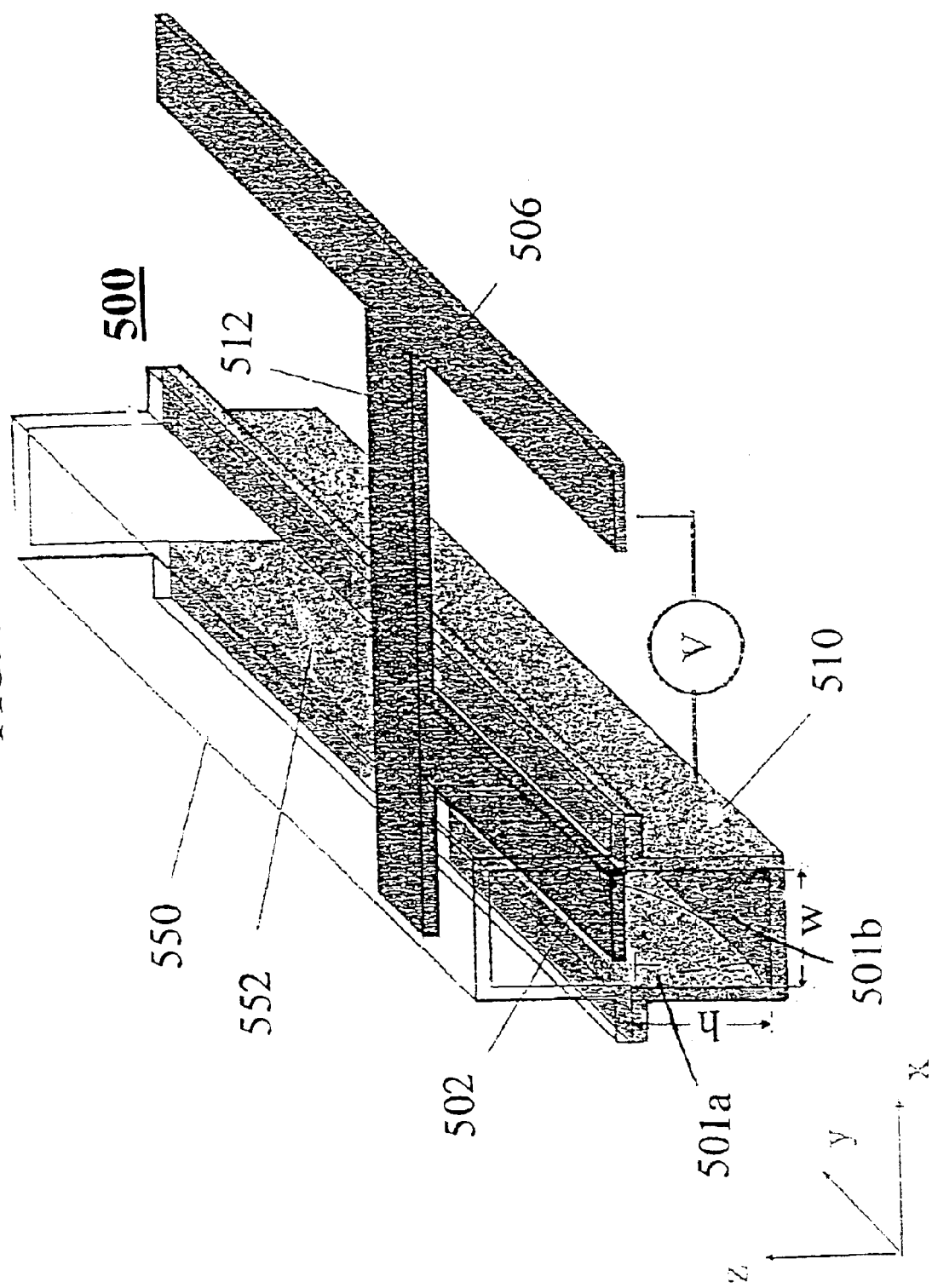
FIG. 5 is a schematic perspective description of a flexible lever positioned in an opened section of a hollow waveguide wall: a) without bias between lever a waveguide wall, and b) with bias between lever and waveguide wall.
Figure 6:
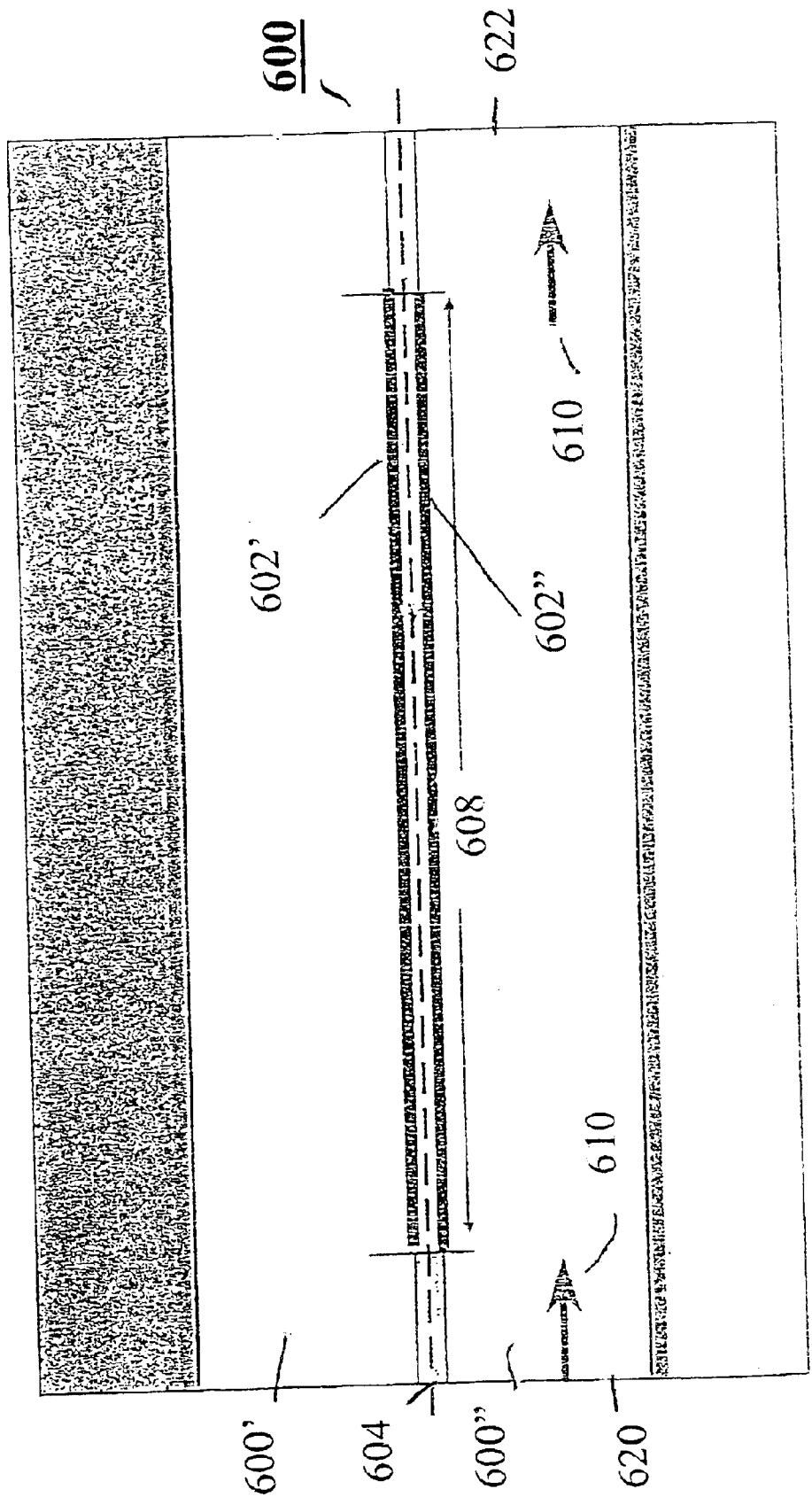
FIG. 6 shows a lateral cross sectional view of a basic switch element comprising two stacked hollow waveguides with flexible levers: a) OFF state, and b) ON state.

FIG. 5a shows in perspective a bottom HW 500 having a rectangular cross-section in an x-z plane, with a width w and a height h, its long axis running along the y-direction, and having an opened top wall (top x-y plane) 501a and a bottom wall 501b. The side and bottom walls of the HV are framed internally by a conductive reflective material, and covered by a dielectric material. The opening is partially covered by a suspended flexible, thin, conductive lever or membrane 502 that lies also in an x-y plane substantially parallel to the top and bottom HW walls, lever 502 lying at least partially in the plane of the missing top wall. A conductive layer (conductor) 506 typically made of a metal such as Al, which serves as an electrode. HW 500 is bonded to a top HW 550 that has a similar open bottom wall 552, the two open walls of the two HWs overlapping over a switching area as defined above. Note that although the figure shows only one lever (502) related to one HW (500), it is to be understood that in a switching device there is preferably an additional lever related to the other HW (550) that is parallel to and substantially overlaps lever 502, as shown in FIG. 6 below. Thus, a basic HW switching device preferably includes two parallel levers.

Lever 502 is designed to have a width (lateral dimension in the x direction) slightly smaller than the width w of the HW, leaving very narrow slits (open spaces) 510 between the lever and the lateral HW walls. The lever thickness is typically 1–2 μm. For a HW width of typically 4 μm, the lever width to thickness aspect ratio is therefore typically between 40:1 to 20:1. In terms of length, the lever is typically between 40–80 times longer than h the depth of the HW, and most preferably between 50 to 60 times h. That is, for a depth of 4 μm, the lever is most preferably between 200 and 240 μm long, and for a depth of 2 μm, the lever is most preferably between 100 and 120 μm long. This preferred ratio, together with a preferred thickness of between 1–2 μm, ensures that the lever assumes the optimal shape upon actuation.

Figure 5B:
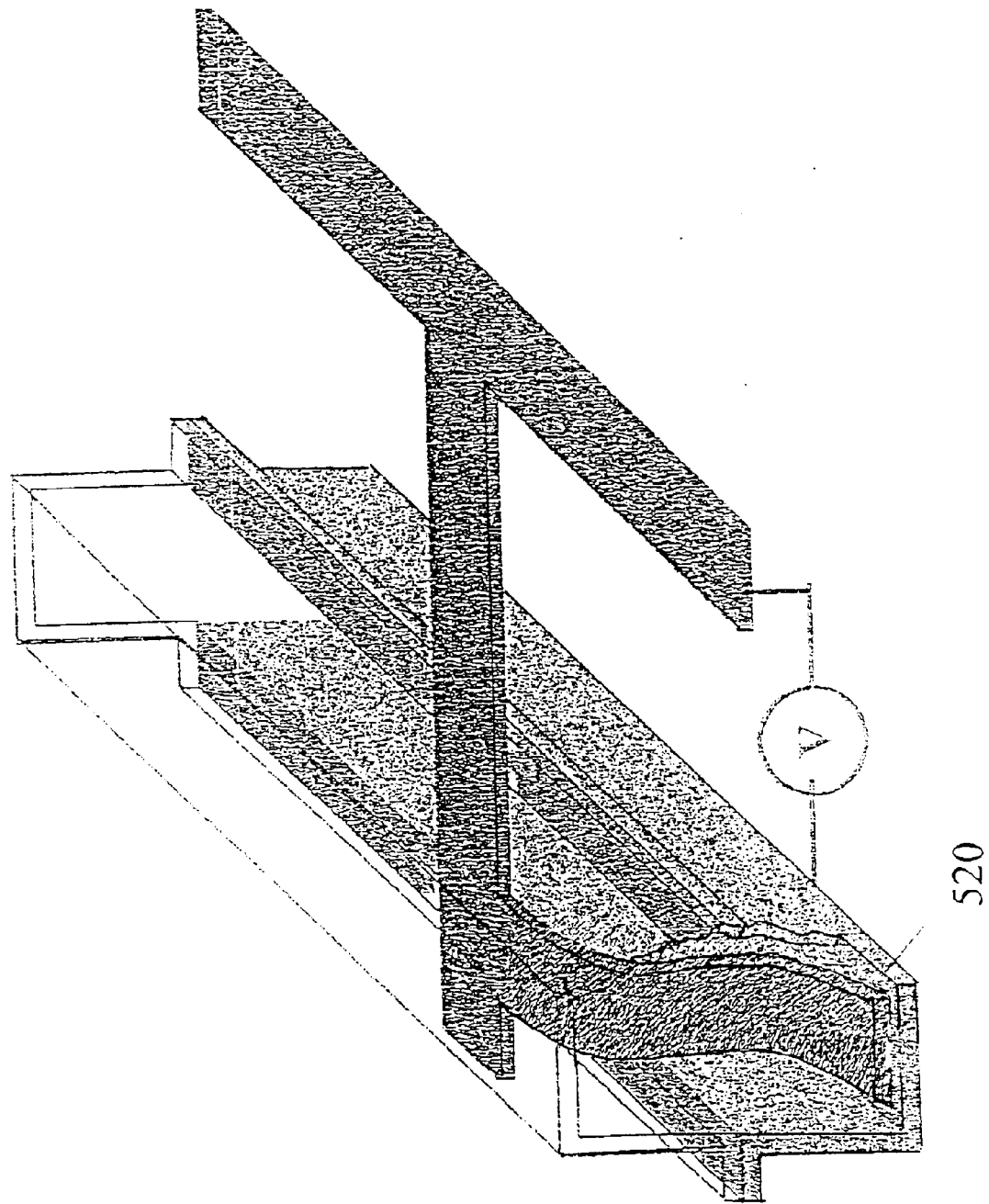

Lever 502 is connected mechanically and electrically to areas away from HW 500 through an arm 512. Thus lever 502 can receive actuating signals, in this case electrical signals through conductor 506. As mentioned above, HW 500 has its internal walls (including the bottom) covered conformably by a conductive layer, typically a metal such as Al, and thus also serves as an electrode. The conductive layer is covered conformably by an isolating dielectric layer. Lever 502 can be actuated by, for example, imposing an electrical voltage on the lever relative to a grounded HW wall. Electrical actuation of conductive membranes, including full waveguides, is well known in the art of MEMS devices. The electrical signal causes a movement of lever 502 along the z-axis, and imparts well-defined shapes to lever 502. Note that although there is an electric field also between the lever and the side walls across slits 510, there is no lateral movement of the lever (in the x direction) because of the stiffness of the lever and the high aspect ratios. The magnitude (amplitude) of the movement and the resulting steady state shape of the lever depend on a number of parameters, the most important ones including the elastic properties of the material of the lever, its thickness and aspect ratio, the voltage and frequency of the electrical signal, etc. For example, for a lever made of aluminum, with a dielectric thickness of 0.1 $\mu$m and aspect ratio of 1/20 (100 $\mu$m length, 0.5 $\mu$m thick), an electrical signal with a voltage amplitude of about 18 V will result in an S-shaped lever 520 shown in FIG. 5b. The waveguide cross-section height h (waveguide depth) here is taken to be 4 $\mu$m. A detailed step by step description of a typical fabrication process of the HW plus lever as in FIG. 5 is given later hereinbelow.

The shape of the flexible switching element in its ON position depends on several parameters, mainly on its flexibility (thickness to length ratio) and the applied voltage. For the case of high flexibility the lever will assume an S-shaped form, while a stiffer lever will assume the form of a curved arc. In both cases, the angle between the deformed lever and the waveguide bottom will be defined by the aspect ratio between the lever length and the waveguide depth. This angle is an important parameter, affecting the optical performance of the switch element and it is provided to be small. As long as this angle is relatively small (within the scale of $\alpha$) the optical performance of the switch element is not affected seriously even in the case when the shape of the lever is not perfect.

FIG. 6a shows a lateral cross sectional view (parallel to the length axis) of a stacked two-HW structure 600 obtained when two HWs 600' and 600", each with a respective suspended flexible lever 602' and 602" are bound "face-to-face", i.e. with their levers lying in proximity and substantially parallel to each other and to a bonding plane 604. It is to be understood that structure 600 is essentially a crossbar or S-shaped HW structure as described above. Preferably, the two levers are identical in structure and dimensions. In FIG. 6a, a switching area 608 is roughly defined by the open areas common to both waveguides and covered by the levers. Area 608 thus represents substantially the common opening area or node as described above for the various configurations. A stacked structure 600 in which the flexible levers can be actuated, preferably electrically, to assume various steady state shapes, in particular the S-shape of FIG. 5b comprises a preferred embodiment of the novel, HW-based and MEMS fabricated optical switch of the present invention.

Figure 6B:
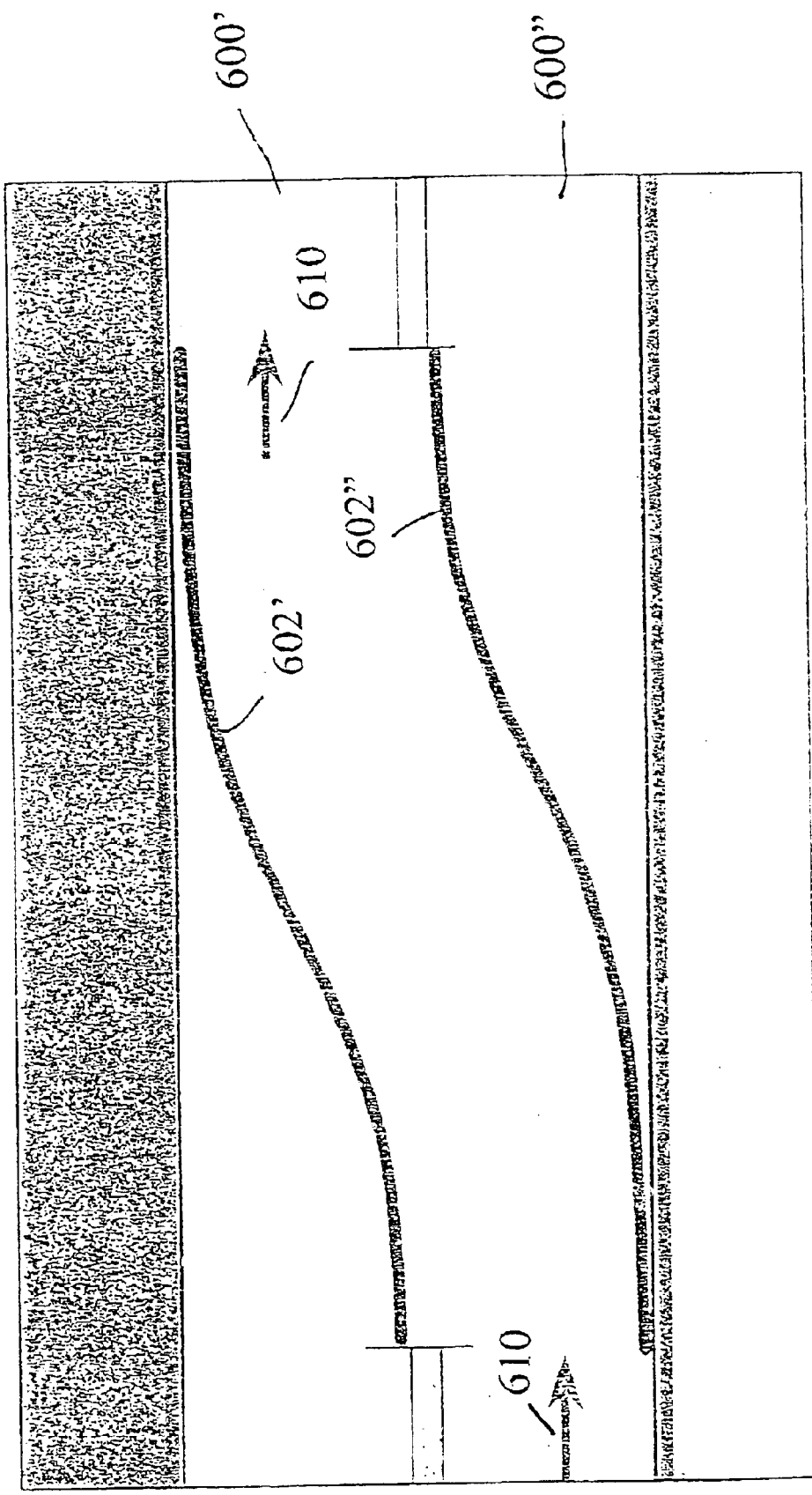

FIG. 6a shows the switch in an OFF state. In the OFF state, a light beam 610 that enters one HW (in this case waveguide 600') from a left side 620 propagates undisturbed in HW 600' past switching area 608, exiting from a right side 622. In this state, levers 602' and 602" are not actuated. FIG. 6b shows the switch in an ON state. In this state, due to electrical actuation that imparts levers 602' and 602" an S-shape shown in cross section—lateral view), light beam 610 entering the switch in waveguide 600' from left side 620 is switched or directed by the pair of levers that act as light guiding "walls" into waveguide 600". The actuation of both levers must be synchronized, so that their shape in any switch position is practically identical, and their positions parallel along their entire length. This provides a smooth enough guiding surface on both levers. The essence of the "switching" operation is thus transfer of optical energy from one guide to the other, triggered by preferably electrical actuation of the levers positioned in the switching area. The HW switch switching action has an (albeit imperfect) analog in the switching or routing of a train from one rail-track to another: light is "routed" from one HW to another in the same way a train is routed from one track to another by movable sections of track ("levers"). As with the HW switch, the two train tracks need not be parallel in general, but must be substantially parallel over the "switching length" of the track where the levers are positioned. In the OFF position, the light, like an un-switched train, continues on the original HW path ("track"). In the ON position, the light switches "tracks" from one HW to the other.

To summarize, the basic switching element of the present invention is comprised of a HW section with two electrodes (lever and bottom conductor) made of a conductive reflective material (metal, for example Al, coated by a single layer or multilayer dielectric material). By imposing an electrostatic force on the movable electrode (lever) of each HW of a pair of adjacent waveguides sharing a common opening, when the waveguide coating is kept at ground voltage, the movable (and flexible element) electrode moves in the direction of the waveguide bottom, and therefore change the switching element position from OFF state to ON state.

Figure 7A:
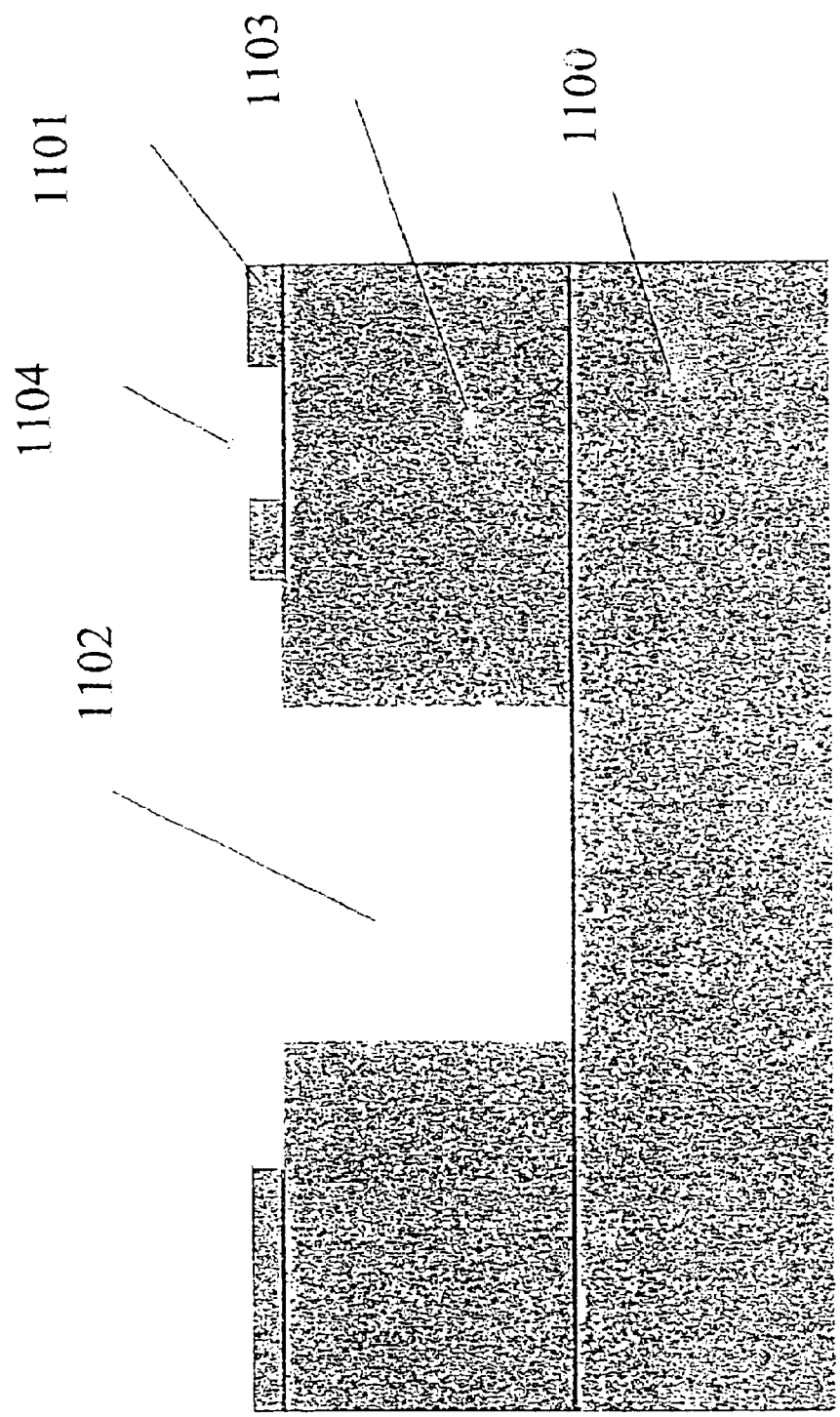
FIG. 7 illustrates in detail an example for the first stage of a process flow for the manufacturing of a waveguide with metallic coating and dielectric layer; with embedded switching element.
Figure 7B:
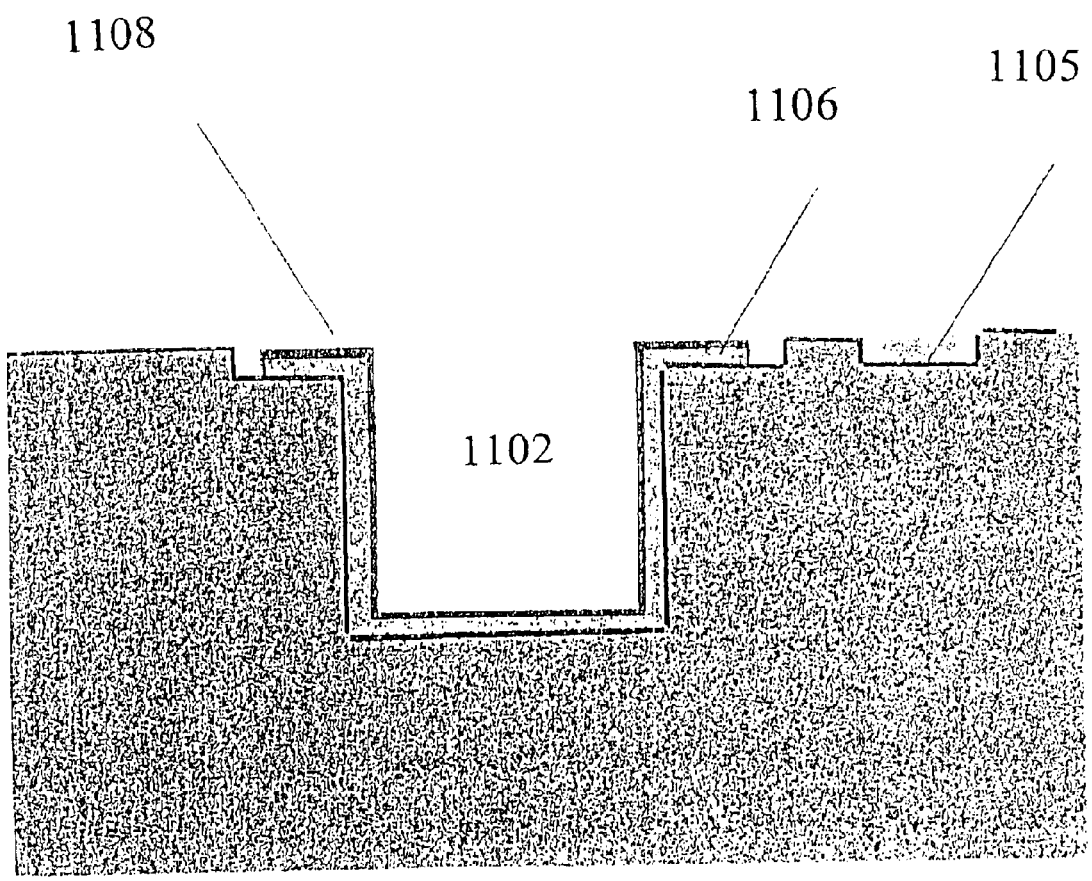

An exemplary process flow to produce HWs with a metallic coating and dielectric layer including embedded switching elements (as well as stacking of the two wafers) is suggested in FIGS. 7a–h. FIG. 7a shows a substrate (wafer) 1100 with a deep-etched rectangular cross section 1102 that will constitute the waveguide core, adjacent to a number of shallower etched throughs 1104. Wafer 1100 is preferably of silicon, but also possibly of other substrate materials commonly used in integrated optics, e.g. silica, quartz, GaAs, etc. In the process, wafer 1100 is first coated by an oxide layer 1103, typically thermally grown, and by a silicon nitride layer 1101, typically LPCVD deposited. A cavity 1104 in nitride 1101 is etched, typically by RIE, in order to produce core 1102. Core 1102 is then etched, typically by using BHF wet etch of oxide 1103. The thickness of the oxide 1103 can vary in accordance with the waveguide dimensions—from a few microns to tens of microns. Next, a dielectric layer 1105 is deposited and patterned, FIG. 7b. This layer provides electrical isolation between wafer 1100 and a first conductive (metal or polysilicon) layer 1106. First conductive layer 1106 (typically Au or Al) serves as coating of the waveguide walls and bottom ("internal core envelope"), as well as an electrical conductive bus. Optionally, a single layer or multilayered dielectric coating 1108 can be provided in order to improve the optical performance of the waveguide, and the electrical isolation between the lever and the conductive layer 1106 covering the waveguide bottom. Typical dielectric materials used for this purpose include silicon nitride, silicon carbide or silicon oxide. The thickness of dielectric layer 1106 is defined by the optical requirements, depends on the wavelength range, and may typically vary between thousands of a few tenths of a micron to a few microns. The thickness of conductive layer 1108 may vary between 0.1 and 1 $\mu$m, and preferably between 0.1 and 0.5 $\mu$m. The deposition of both dielectric and conductive layers can be performed with various physical, chemical and electro-chemical techniques, well known in the art.

Figure 7C:
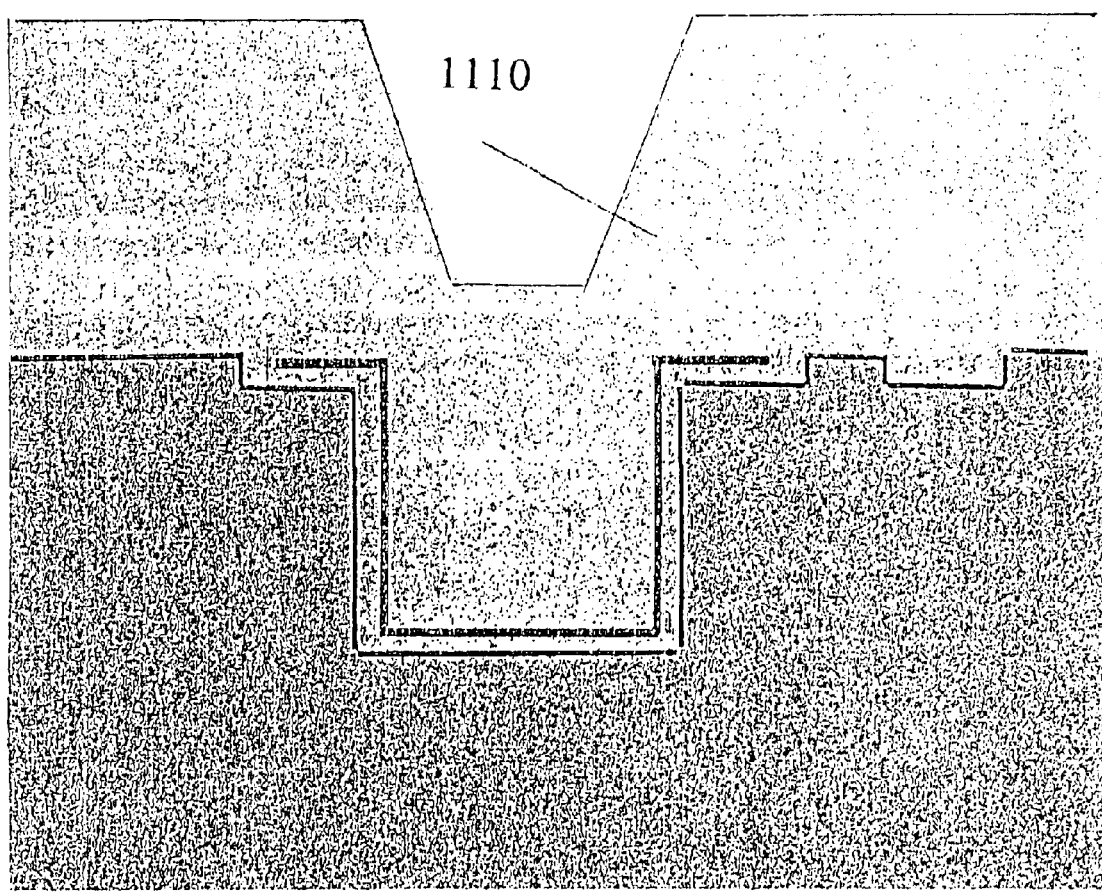
Figure 7D:
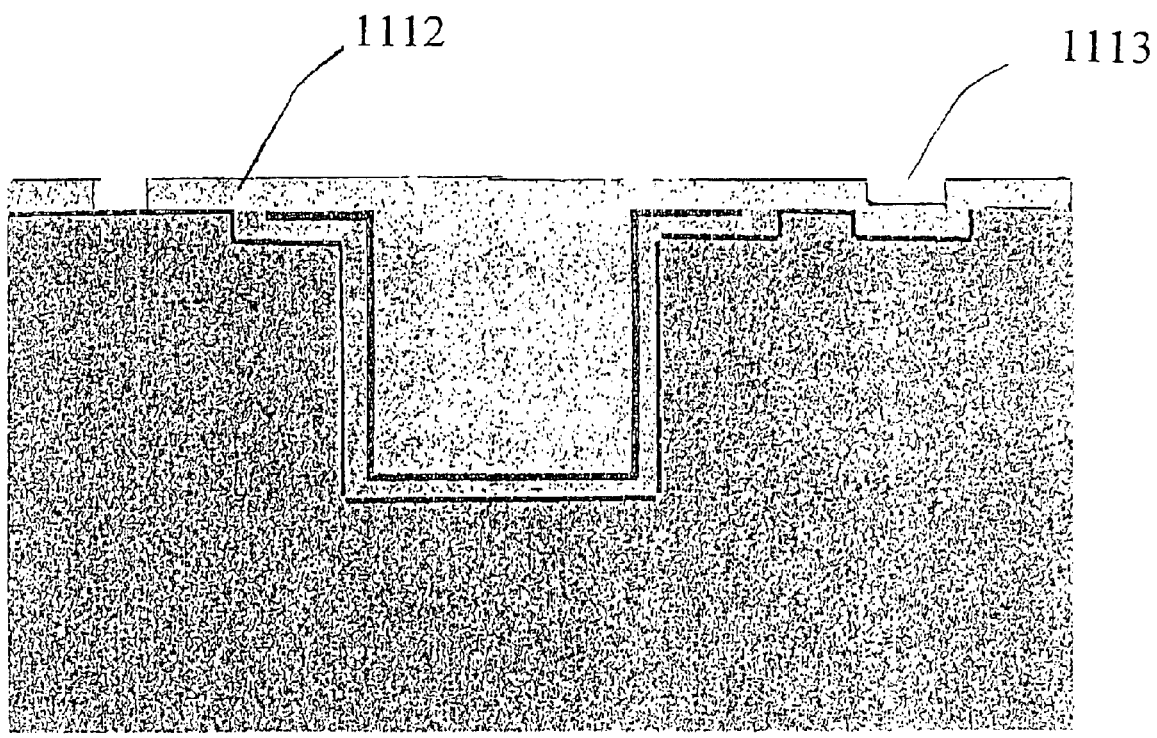
Figure 7E:
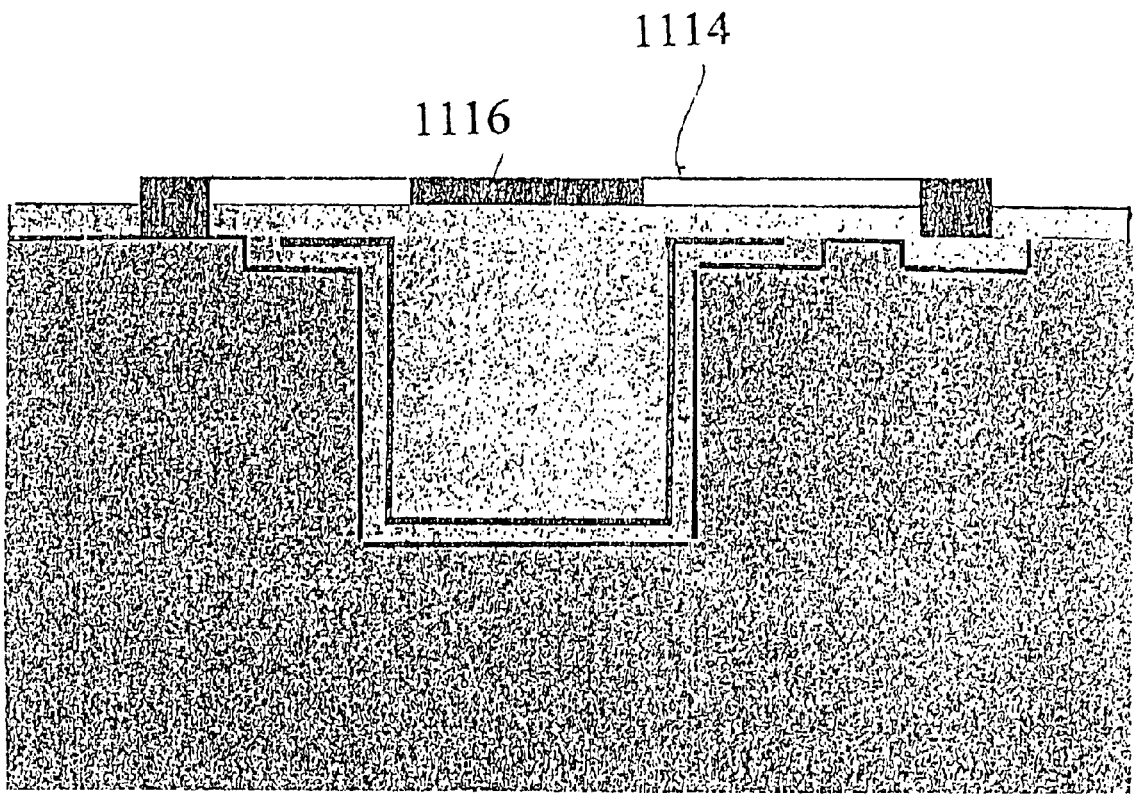
Figure 7F:
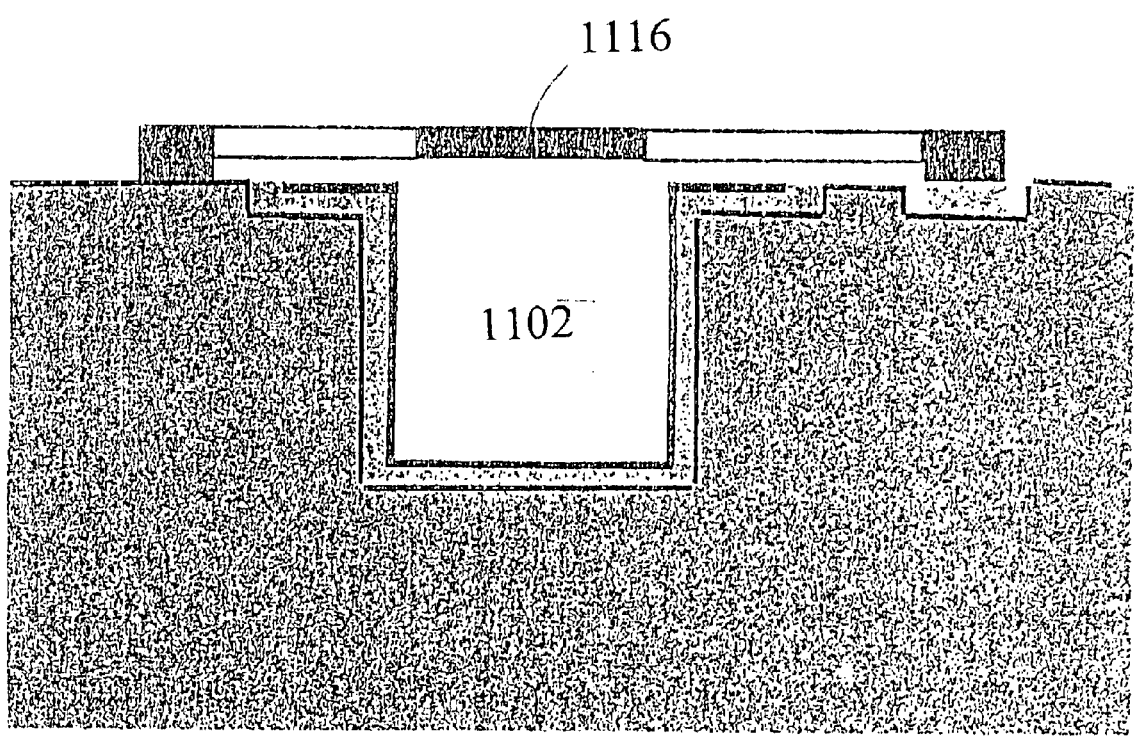

Next follows a sacrificial layer (silicon oxide, metal or polymer) deposition step, as shown in FIG. 7c, in which a sacrificial layer 1110 is deposited conformably, for example by plasma enhanced chemical vapor deposition (PECVD), on top of the entire wafer. The oxide also fills the entire HW core 1102. The oxide deposition step is followed by a planarization step, shown in FIG. 7d, in which the oxide is etched and planarized everywhere except in HW core 1102, using known techniques such as chemomechanical polishing (CMP), to leave a planar wafer surface 1112. After the polishing, a via 1113 for connecting the electrical bus that includes first conductive layer 1105 with a second conductive layer 1114 (FIG. 7e) is etched in the top of layer 1112 FIG. 7. Conductive layer 1114 is typically a metal or a metal coated polysilicon layer 1114 that is deposited on wafer 1100 and patterned and etched using commonly known procedures. A section 1116 of layer 1114 that overlaps partially the HW cross section represents a lever cross section. A last step (FIG. 7f) includes the release of the lever structure through the etching of the remaining oxide from core 1102, leaving lever 1115 suspended over the core. Optionally, the reflective coating of the conductive-reflective elements is performed after the release, in order to improve the optical performance.

Figure 7G:
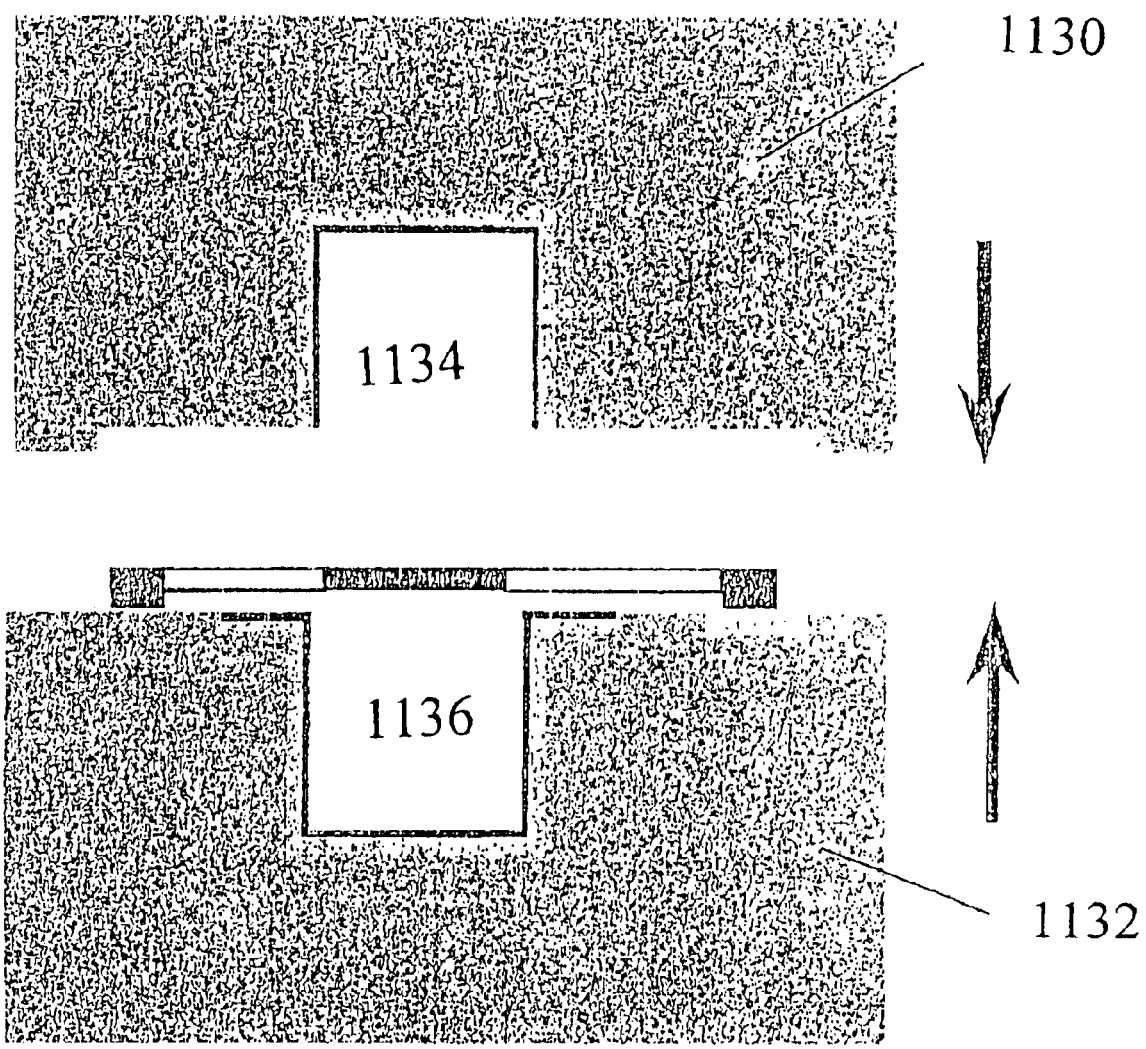
Figure 7H:
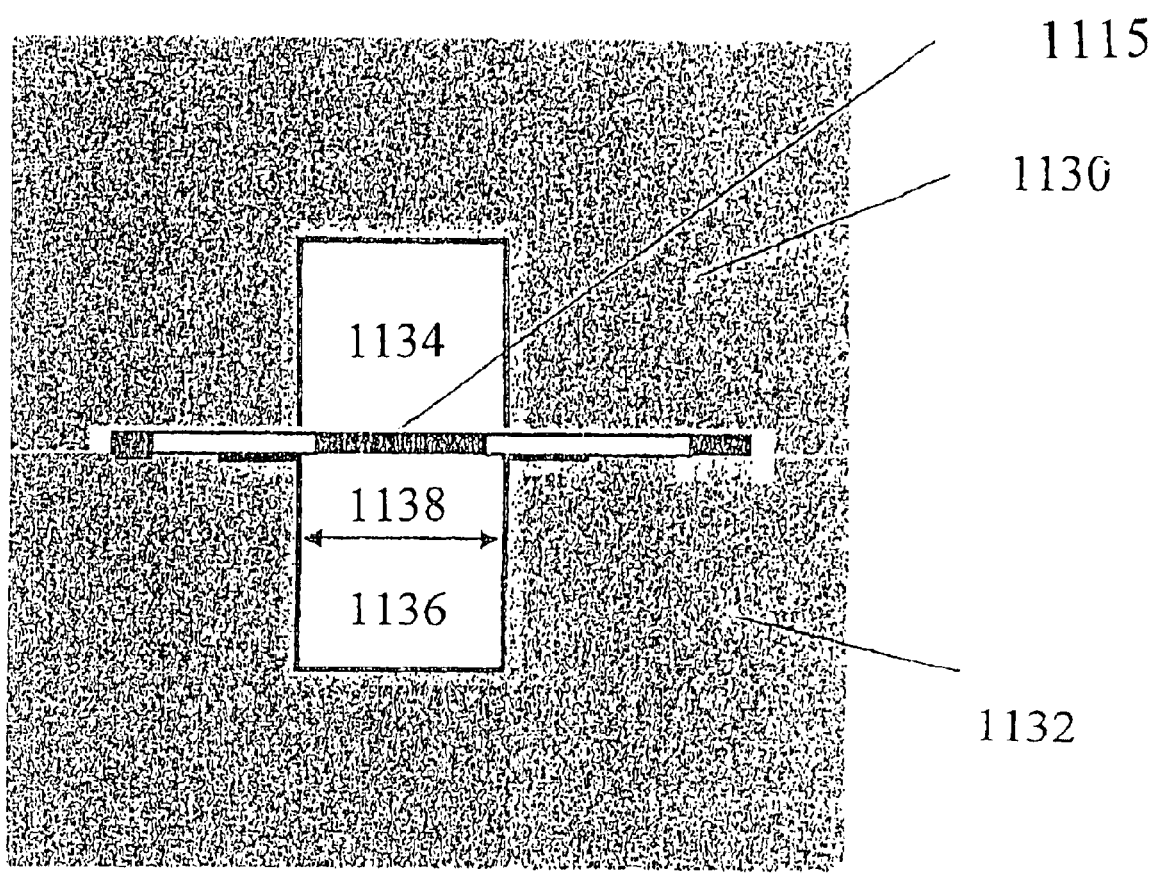

FIGS. 7g–h illustrate the formation of a HW switch using two HWs processed as FIGS. 7a–f: in FIG. 7g, a top wafer 1130 is shown ready to be bonded to a bottom wafer 1132. There are various bonding methods, well known in the art, including fusion bonding eutectic bonding and direct silicon diffusion bonding. Other applicable bonding methods include using an adhesive layer, such as a glass, or photoresist. In the example illustrated by FIGS. 7g,h, top wafer 1130 has undergone only partial processing, ended in the deposition of a conductive layer 1132 over a top core 1134, while bottom wafer 1132 has undergone the full process described in FIGS. 7a–f. FIG. 7h shows wafers 1130 and 1132 after "face-to-face" bonding, such that respective waveguide cores 1134 (in top wafer 1130) and 1136 (in bottom wafer 1132) overlap over a common overlap area 1138, which is covered almost entirely by lever 1115.

As mentioned above, the HW switch of the present invention may be built without a separate dielectric coating, in which case the dielectric deposition step (FIG. 7b, coating 1108) may be skipped. In this embodiment, the oxide is deposited directly on layer 1106 followed by etching and planarization, and by the deposition of a metal "anchor" that will hold the lever.

One of the advantages of the switch element and elementary switch cell of the present invention lies in the capability of enhanced scale-up. The preferred embodiments shown in FIGS. 3, 4, 5 are three-dimensional. That is, at every node between two overlapping HWs in a cross bar, there is a potential switch. When an array or matrix of switches is built based on the elementary cells shown for example in FIGS. 3c and 4, very large switch matrices with relatively small insertion loss can be built. The actual actuation of a switch located at an $n^{th}$ node of a MxN matrix of nodes results in the switching of light from one plane (say the bottom) to the other plane (in this case the top) and vice versa. Clearly, various switch architectures including fan-outs from 1 to N ports, M to 1 ports as well as switching from any input port (of the M) to any output port (of the N) are possible. This relatively low loss scale-up feature of the HW switch based matrices represents one of the advantages of the present invention.

The number of ports that can be theoretically switched by one crossbar is defined by the number of elementary cells that can be located within the MEMS die. This number is subject to the wafer size, fabrication yield, the distance between waveguides, and the angle between each two crossing waveguides in the switching area. Computed on the basis of one 4" wafer and 1 die per wafer, this number is as presented in the Tables below:

TABLE 1

Dimensions of the basic cell for the case of rectilinear waveguides

| α, | Distance between waveguides W (see FIG. 3c) μm | | | | | | | | | |
|---|---|---|---|---|---|---|---|---|---|---|
| deg | 50 | 75 | 100 | 125 | 150 | 175 | 200 | 225 | 250 | 50 |
| 0.5 | 11459 | 17188 | 22918 | 28647 | 34377 | 40106 | 45836 | 51565 | 57295 | 11459 |
| 1.0 | 5729 | 8594 | 11458 | 14323 | 17188 | 20052 | 22917 | 25781 | 28646 | 5729 |
| 1.5 | 3819 | 5729 | 7638 | 9548 | 11458 | 13367 | 15277 | 17186 | 19096 | 3819 |
| 2.0 | 2864 | 4296 | 5728 | 7160 | 8592 | 10024 | 11456 | 12888 | 14320 | 2864 |
| 2.5 | 2291 | 3436 | 4582 | 5727 | 6873 | 8018 | 9164 | 10309 | 11455 | 2291 |
| 3.0 | 1909 | 2863 | 3818 | 4772 | 5726 | 6681 | 7635 | 8589 | 9544 | 1909 |
| 3.5 | 1636 | 2454 | 3271 | 4089 | 4907 | 5725 | 6543 | 7361 | 8179 | 1636 |
| 4.0 | 1431 | 2146 | 2862 | 3577 | 4293 | 5008 | 5724 | 6439 | 7155 | 1431 |
| 4.5 | 1272 | 1907 | 2543 | 3179 | 3815 | 4451 | 5086 | 5722 | 6358 | 1272 |
| 5.0 | 1144 | 1716 | 2288 | 2860 | 3432 | 4004 | 4576 | 5148 | 5720 | 1144 |

TABLE 2

Number of elementary cells on 4" wafer for the case of rectilinear waveguides

| | Distance between waveguides W (see FIG. 3c), μm | | | | | | | | | |
|---|---|---|---|---|---|---|---|---|---|---|
| α, deg | 50 | 75 | 100 | 125 | 150 | 175 | 200 | 225 | 250 | 50 |
| 0.5 | 8 | 5 | 4 | 3 | 2 | 2 | 2 | 1 | 1 | 8 |
| 1.0 | 17 | 11 | 8 | 7 | 5 | 5 | 4 | 3 | 3 | 17 |
| 1.5 | 26 | 17 | 13 | 10 | 8 | 7 | 6 | 5 | 5 | 26 |
| 2.0 | 35 | 23 | 17 | 14 | 11 | 10 | 8 | 7 | 7 | 35 |
| 2.5 | 44 | 29 | 22 | 17 | 14 | 12 | 11 | 9 | 8 | 44 |
| 3.0 | 53 | 35 | 26 | 21 | 17 | 15 | 13 | 11 | 10 | 53 |
| 3.5 | 62 | 41 | 31 | 24 | 20 | 17 | 15 | 13 | 12 | 62 |
| 4.0 | 71 | 47 | 35 | 28 | 23 | 20 | 17 | 15 | 14 | 71 |
| 4.5 | 79 | 53 | 39 | 31 | 26 | 22 | 19 | 17 | 15 | 79 |
| 5.0 | 88 | 59 | 44 | 35 | 29 | 25 | 22 | 19 | 17 | 88 |

· in the case of 6" wafer the number increases in 50%

TABLE 3

Dimensions of the basic cell for the case of S-shaped waveguides

| α, deg | Distance between waveguides W (see FIG. 4), μm | | | | | | | | | L lever |
|---|---|---|---|---|---|---|---|---|---|---|
| | 50 | 75 | 100 | 125 | 150 | 175 | 200 | 225 | 250 | |
| 2.0 | 4664 | 6096 | 7528 | 8960 | 10392 | 11824 | 13256 | 14688 | 16120 | 900 |
| 2.5 | 3591 | 4736 | 5882 | 7027 | 8173 | 9318 | 10464 | 11609 | 12755 | 650 |
| 3.0 | 3109 | 4063 | 5018 | 5972 | 6926 | 7881 | 8835 | 9789 | 10744 | 600 |
| 3.5 | 2636 | 3454 | 4271 | 5089 | 5907 | 6725 | 7543 | 8361 | 9179 | 500 |
| 4.0 | 2331 | 3046 | 3762 | 4477 | 5193 | 5908 | 6624 | 7339 | 8055 | 450 |

TABLE 4

Number of elementary cells on 4" wafer for the case of S-shaped waveguides

| α, deg | Distance between waveguides W (see FIG. 4), μm | | | | | | | | |
|---|---|---|---|---|---|---|---|---|---|
| | 50 | 75 | 100 | 125 | 150 | 175 | 200 | 225 | 250 |
| 2.0 | 21 | 16 | 13 | 11 | 9 | 8 | 7 | 6 | 6 |
| 2.5 | 28 | 21 | 17 | 14 | 12 | 10 | 9 | 8 | 7 |
| 3.0 | 32 | 25 | 20 | 17 | 14 | 12 | 11 | 10 | 9 |
| 3.5 | 38 | 29 | 23 | 19 | 17 | 15 | 13 | 12 | 11 |
| 4.0 | 43 | 33 | 27 | 22 | 19 | 17 | 15 | 13 | 12 |

· in the case of 6" wafer the number increases in 50%

In summary, the invention disclosed herein describes a novel HW optical switch and HW switch arrays or matrices for optical switch networks with the following attributes:
a. Switches may be implemented between two physical layers (wafers). The use of two physical layers permits to build the switching system architecture as a crossbar when 1×N switching to N output channels is possible for any of M input waveguides (channels).
b. Waveguides can be implemented as channels etched within the wafer, or hollow channels built on the wafer surface. They can be of circular, rectangular, polygon or any other cross-section shape. c. Provision of a dielectric coating on the internal part of the waveguide decreases losses and provides electrical isolation.
d. The number of ports that can be theoretically switched by one crossbar is defined by the number of basic cells that can be located within the MEMS die, and is a function of wafer size, fabrication yield, distance between waveguides, and the angle between each two crossing waveguides in the switching area.

All publications, patents and patent applications mentioned in this application are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

While the invention has been described with respect to a limited number of embodiments, it will be appreciated that many variations, modifications and other applications of the invention may be made.

What is claimed is:

1. An optical switching device, comprising:
   a. a first hollow waveguide having a cross section defined by a first core surrounded by a first enveloping wall, said first wall having a first opening;
   b. a second hollow waveguide having a second cross section defined by a second core surrounded by a second enveloping wall, said second wall having a second opening, said first and said second hollow waveguides positioned in a partially overlapping position defined by a common overlap of their respective said openings;
   c. a first light guiding lever positioned substantially in the plane of said first opening and operative to be actuated by actuating signals to assume at least one switching position in which said first lever has a curved shape, wherein said curved shape is selected from the group consisting of an S-shape and a curved arc, and
   d. a second light guiding lever positioned substantially in the plane of said second opening and operative to be actuated by actuating signals to synchronically assume at least one switching position essentially identical with said at least one switching position of said first light guiding lever.

2. The device of claim 1, wherein said first and second waveguides are characterized by respective first and second depths, and wherein said first and second levers are characterized by having lever lengths preferably 40–80 times larger, and most preferably 50–60 times larger than respectively said first and second waveguide depths.

3. The device of claim 2, wherein said first and second levers are further characterized by each having a lever width and a lever thickness, and wherein a preferred ratio of said width to said thickness is between 4:1 to 2:1.

4. A hollow waveguide based optical switch comprising:
   a. a pair of hollow waveguides overlapping over a common section that includes a common opening;
   b. a first conductive and reflective flexible lever attached to one of said hollow waveguides, said first lever configured to assume upon actuation at least one switching position in which said lever has a curved shape; and
   c. a second conductive and reflective flexible lever attached to the other of said hollow waveguides, said second lever configured to assume upon same said actuation at least one switching position identical and parallel with said at least one switching position of said first level, wherein said curved shape is selected from the group consisting of an S-shaped and a curved arc;
   whereby said first and said second actuated levers serve as light guiding wall sections for switching light between said pair of hollow waveguides.

5. A hollow waveguide switch matrix comprising:
   a. a first plurality of hollow waveguides arranged substantially in a first plane, each of said first plurality of waveguides having at least one first opening;
   b. a second plurality of waveguides arranged substantially in a second plane parallel with said first plane, each of said second plurality of waveguides having at least one second opening substantially overlapping a different opening of said at least one first opening;

c. a first actuable light guiding lever related to each said first waveguide of said first plurality and positioned substantially within said at least one first opening, said first lever operative to acquire a curved shape in at least one switching position; and d. a second actuable light guiding lever related to each said second waveguide of said second plurality and positioned substantially within said at least one second opening and in parallel with said first actuable lever, said second lever operative to acquire a curved share identical with that of said first lever in same said at least one switching position, wherein said curved shape is selected from the group consisting of an S-shape and a curved arc;

whereby synchronous actuation of said first and second light guiding levers results in said levers switching light between said first and said second pluralities of waveguides.

6. A method for switching light between two non-coplanar hollow waveguides, each waveguide having a light guiding envelope and a hollow core, the method comprising the steps of:

a. providing a substantially identical opening in each envelope, the two waveguides having an common overlap region defined by their respective openings;

b. forming, in each waveguide, a suspended flexible light guiding lever that in an unactuated state lies in the plane of said respective opening and serves as a light guiding section of the respective envelope, wherein said step of forming includes forming a lever that substantially fills said opening; and c. synchronously actuating said levers to assume an actuated switching position in which said levers are curved and parallel to each other; whereby in said switching position said levers act as sections of a hollow waveguide envelope to guide light from one waveguide to the other, wherein said step of synchronously actuating said levers to assume an actuated switching position in which said levers are curved includes synchronously actuating said levers to assume each an S-shape that connects the envelopes of the two waveguides.

* * * * *